R. SOHLMAN & C. O. LUNDHOLM.
PROCESS OF CONCENTRATING NITRIC ACID.
APPLICATION FILED APR. 19, 1909.
1,009,197.
Patented Nov. 21, 1911.
2 SHEETS—SHEET 1.
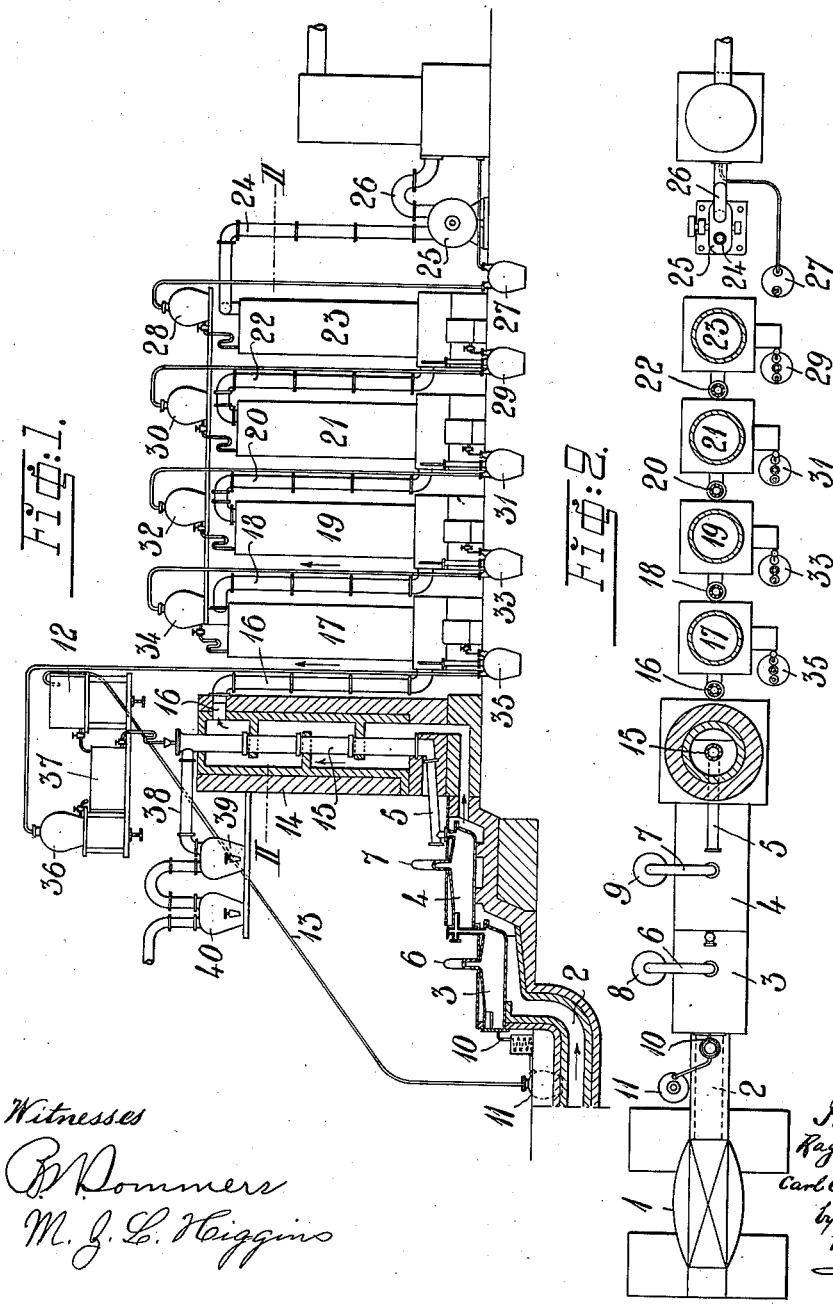

R. SOHLMAN & C. O. LUNDHOLM.
PROCESS OF CONCENTRATING NITRIC ACID.
APPLICATION FILED APR. 19, 1909.
1,009,197.
Patented Nov. 21, 1911.
2 SHEETS—SHEET 2.
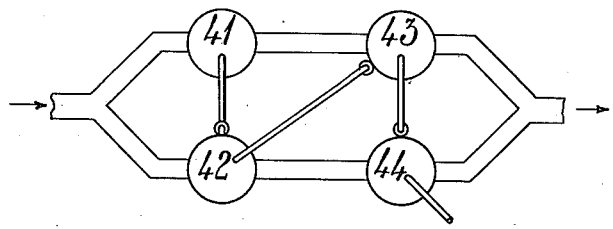
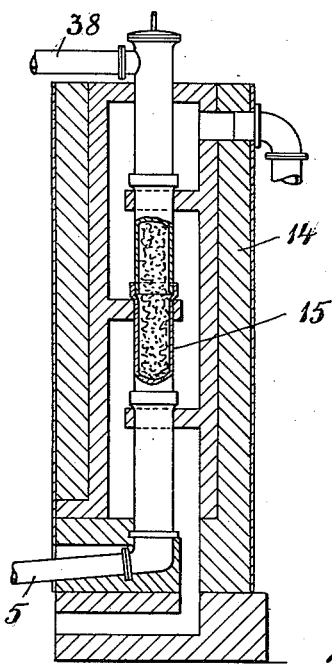

UNITED STATES PATENT OFFICE.

RAGNAR SOHLMAN, OF BOFORS, SWEDEN, AND CARL OLOF LUNDHOLM, OF ARDEER, SCOTLAND.

PROCESS OF CONCENTRATING NITRIC ACID.

1,009,197.  Specification of Letters Patent.  Patented Nov. 21, 1911.

Application filed April 19, 1909. Serial No. 490,960.

*To all whom it may concern:*

Be it known that we, RAGNAR SOHLMAN, a subject of the King of Sweden, and resident of Bofors, Sweden, and CARL OLOF LUNDHOLM, a subject of the King of the United Kingdom of Great Britain and Ireland, and resident of Ardeer, Scotland, have invented new and useful Improvements in Processes of Concentrating Nitric Acid, of which the following is a specification, reference being had to the accompanying drawing, which forms a part of this specification.

This invention relates to an improved process of concentrating nitric acid.

In the production of nitric acid by oxidizing the nitrogen of the air by the influence of the electric arc the acid heretofore has been obtained in a very diluted condition, generally containing about 25%, and at most 35 to 40% of pure nitric acid, and has thereafter been utilized by being transformed into nitrate, the solution having been neutralized by a suitable base, usually lime, whereupon the solution of nitrate has been evaporated to dryness.

The reason why the concentration of the acid in the process of production heretofore generally used cannot be driven over the limit above stated, is that by reason of the percentage of oxids of nitrogen of the air coming from the electric furnace being very small, an effective washing of the gas mixture with a weak acid and water is required for binding as perfectly as possible the combinations of nitrogen in the form of nitric acid.

The greater part of the electric energy is transformed into heat in oxidizing the nitrogen of the air under the influence of the electric arc, so that the gases coming from the electric furnaces in most cases have a comparatively high temperature. The heat of said gases heretofore has been utilized for generating steam, the gases having been led from the furnaces through steam generators. However, a great deal of said heat has been wasted, inasmuch as it has been necessary to further cool the gases to the usual temperature by means of cooling water, in order to secure the absorption of the combinations of nitrogen in the absorption system.

The present invention relates to a process by which it is possible to produce, from the acid of 25 to 40% produced by well known methods, a concentrated acid of 90 to 97%, such as is generally used for industrial purposes, the said process rendering it possible to utilize in a rational manner the heat of hot gases, and being, therefore, suitable for use in connection with the production of nitric acid by the electric oxidation of nitrogen of the air. The invention is hereinafter more particularly described with respect to such application thereof, and in the accompanying drawings, wherein like parts are similarly designated, we have illustrated a concentration plant for carrying our invention into practice.

Figure 1 is a side elevation of the plant, partly in section, and Fig. 2 is a horizontal section on line II—II of Fig. 1. Fig. 3 shows diagrammatically a modification of a part of the plant. Fig. 4 is a sectional view on a larger scale, of the tower 14, Fig. 1.

The concentration of the acid takes place in two steps, viz. (*a*) from 25 to 40% to about 60% by direct contact with the furnace gases in suitable towers or tower systems, preferably based on the principle of counter-currents: (*b*) from about 60% to 90%–97% by distilling the nitric acid from a mixture of the acid of 60% obtained according to (*a*) and sulfuric acid, in suitable continuously working apparatus, heated externally by the furnace gases.

The cooling of the gases takes place in three main steps, viz. (1) By leading them below or around suitable, continuously working apparatus for concentrating sulfuric acid, in which the dilute sulfuric acid obtained in distilling concentrated nitric acid from its mixture with sulfuric acid (according to *b* above described) is again concentrated to its original strength. (2) By leading the gases around distillation towers or similar apparatus, mentioned above under *b*, in which the separation of the nitric acid from the mixture of sulfuric acid and nitric acid takes place. (3) By direct contact with weak nitric acid obtained according to *a* above, whereby the heat of the gases is utilized for vaporizing water from the dilute acid.

No one of the above mentioned steps is novel *per se*, each of them having been previously used in different departments of chemical industry. By the combination of such steps in the manner stated above, while utilizing the electrically generated heat as set forth, a result heretofore not reached will be attained with respect to the effective utilization of the heat, as well as with respect to a rapid cooling of the nitrified gases necessary for the absorption of the nitrogen compounds.

We have succeeded in the manner set forth, in transferring continuously about 70% of the quantity of nitric acid, which according to well known and generally used methods can be produced by using electric nitrifying furnaces, into strong acid of 95% to 97%, and of a very high degree of purity.

In carrying out the invention the concentration of sulfuric acid as mentioned above, lowers the temperature of the gases from about 700° C. to about 450–500° C., the distillation of the nitric acid lowers the temperature of the gases from 500–450° C. to 350–300° C., while the remaining heat down to 50°–75° C. is used for concentrating the weak nitric acid.

Referring to the drawings, 1 (Fig. 2) indicates an electric furnace in which the nitrogen of the air is oxidized. The hot gases coming from said furnace are led through the heat-insulated channel 2 to the boilers 3—4, which are surrounded by the gases. The said boilers are adapted for concentrating sulfuric acid; the dilute sulfuric acid (of about 78%) is supplied continuously through the pipe 5, a part of the water distils off together with a small quantity of acid, through the pipes 6, 7, which are connected to suitable cooling apparatus, 8, 9, and the concentrated sulfuric acid flows off through the pipe 10 to a cooling apparatus, and from thence to the acid-egg 11, from which it is forced into the receptacle 12 through pipe 13. The hot furnace gases further pass through a tower apparatus 14 surrounding a pipe 15 of acid-proof pig-iron, and through the pipe 16 to the bottom of the tower 17, then upward through said tower, through the pipe 18 to the bottom of the tower 19, upward through the latter and through pipe 20, tower 21, pipe 22, tower 23 and pipe 24 to the exhauster 25. From the latter the gases, which are now perfectly cooled, pass through the pipe 26 to other well-known absorption towers or apparatus which may fully absorb the remaining percentage of oxids of nitrogen in the gases. The latter towers form no part of the present invention, and only one of them is, therefore, shown in the drawing. At the top of the tower 23 is the reservoir 28, supplied from the acid-egg 27 with weak nitric acid of the strength obtained in the above-mentioned absorption system, not shown, for instance, nitric acid of 25%. During the passage through the tower 23 the said acid is somewhat heated by the current of hot gases passing through the tower in an opposite direction. The acid thereupon flows down into the acid-egg 29 and is progressed through reservoir 30, tower 21, acid-egg 31, reservoir 32, tower 19, acid-egg 33, reservoir 34, and tower 17, and is successively heated and concentrated by a fractional distillation in said towers. In the last mentioned tower 17, the acid which has already been somewhat concentrated, meets the hot gases supplied to the said tower through the channel 16. The tower works in the manner of a column apparatus, the acid being caused to boil, whereby water is continuously distilled off together with some nitric acid, while the acid flowing down becomes more and more concentrated and its boiling point is raised. In this manner it would be theoretically possible to produce acid of about 70%. In practice, however, it has been found to be most suitable, when using acid of a strength that can advantageously be obtained in an absorption system without loss of nitrous gases, viz. a strength of 25% to 30%, to concentrate the same to about 60% by direct contact with the hot furnace gases. The nitric acid flows from the tower into the acid-egg 35 and is forced therefrom up into the receptacle 36.

For further concentration the nitric acid of 60% is mixed in well known manner with sulfuric acid and distilled. The distillation is also accomplished continuously in the column apparatus 15 as follows. Nitric acid from the receptacle 36 and sulfuric acid from the receptacle 12 are mixed in suitable proportions in the mixing apparatus 37, and the mixture flows continuously to the column apparatus 15. The latter consists of a pipe of acid-proof material, such as pig-iron with a high percentage of silicon, filled with pieces of silica or the like. The nitric acid distils off through the pipe 38 and is condensed in suitable cooling apparatus, represented in Fig. 1 by the carboys 39, 40. The sulfuric acid, which retains the greater part of the water contained in the mixture of the acids, flows off through the pipe 5, and is concentrated in the boilers 4, 3, in the manner described above.

Instead of using an electric source of heat, a current of gas heated by other means, for instance, gases of combustion, or air heated by such gases, may obviously be used. Consequently the present invention may be used in other departments of chemical industry, as well as for producing nitric acid in the electric way, for instance, for utilizing the waste acid and weak nitric acid obtained in the production of explosives.

The apparatus used in the various stages of the process may of course be modified in many ways without departing from the principle of our invention. Thus, instead of using four pre-concentration towers 17, 19, 21, 23 in series, as shown in Fig. 1, the towers may be arranged in two parallel rows of two towers each, and the acid may be conveyed in zig-zag from the one tower to the other, as is shown diagrammatically in Fig. 3. The towers, 41, 42, 43, 44, here constitute two parallel systems, through each of which a current of hot gas is directed. The weakest acid is fed to the top of the tower 44, having then a strength of say 25% of $HNO_3$. In passing through this tower, the acid is strengthened, up to, say, 28%, both by the condensation of acid distilling over with the gas from tower 42, and by evaporation of water and weaker acid, carried off from 44 by the gas escaping from the tower. The acid thus pre-concentrated and pre-heated, is conveyed to tower 43, where a further concentration takes place, say up to 35%, then to 42, where the concentration is brought to, say 50%, and finally to 41, where the strength of the issuing acid is increased up to 58-60%. This manner of operating has the advantage that a larger percentage of the weak acid fed to the last tower is recovered from the tower 41 as concentrated acid.

Instead of using the apparatus described, for the purpose of distilling off strong nitric acid from its mixture with sulfuric acid, and for concentrating again the weak sulfuric acid thus obtained, it is, of course, possible to use various other well known apparatus, working either continuously or intermittently. Thus, both these operations may be successively carried out by using a system of several pans of the same type as the pans 3, 4, shown in Fig. 1, arranged in a series of, for instance, four. Or the concentration of surfuric acid may be effected in a tower apparatus of any well known type, heated by a part of the furnace gases passing through said tower.

We claim—

The process of concentrating weak nitric acid, which consists in making a preliminary concentration of nitric acid by direct contact with a current of hot gases, mixing the nitric acid thus concentrated with concentrated sulfuric acid, and distilling the nitric acid from the mixture and then concentrating the sulfuric acid for re-use in the process, one and the same current of hot gases being successively utilized for concentrating the dilute sulfuric acid, for distilling strong nitric acid from the mixture of nitric and sulfuric acids, and for pre-concentrating the weak nitric acid by direct contact with the hot gases, substantially as and for the purpose set forth.

In testimony that we claim the foregoing as our invention, we have signed our names in presence of two subscribing witnesses.

RAGNAR SOHLMAN.
CARL OLOF LUNDHOLM.

Witnesses:
JOHN DELMAR,
EWALD DELMAR.